(12) United States Patent
Kuwada (10) Patent No.: US 9,083,209 B2
(45) Date of Patent: Jul. 14, 2015

(54) DRAIN STRUCTURE OF ELECTRIC ROTATING MACHINE

(75) Inventor: Akina Kuwada, Kariya (JP)

(73) Assignee: DENSO CORPORATION, Kariya (JP)

( * ) Notice: Subject to any disclaimer, the term of this patent is extended or adjusted under 35 U.S.C. 154(b) by 514 days.

(21) Appl. No.: 13/279,698

(22) Filed: Oct. 24, 2011

(65) Prior Publication Data

US 2012/0104888 A1 May 3, 2012

(30) Foreign Application Priority Data

Oct. 29, 2010 (JP) ................................ 2010-243015

(51) Int. Cl.
*H02K 5/10* (2006.01)

(52) U.S. Cl.
CPC .............. *H02K 5/10* (2013.01); *H02K 2205/09* (2013.01)

(58) Field of Classification Search
CPC ............................. H02K 5/10; H02K 2205/09
USPC ................................................. 310/71, 88, 89
IPC ......................................... H02K 5/10, 2205/09
See application file for complete search history.

(56) References Cited

U.S. PATENT DOCUMENTS

| | | | | |
|---|---|---|---|---|
| 4,808,871 A | * | 2/1989 | Morishita et al. | 310/89 |
| 4,978,875 A | * | 12/1990 | Okamoto | 310/88 |
| 5,053,633 A | * | 10/1991 | Sugiyama et al. | 290/48 |
| 5,077,503 A | * | 12/1991 | Tamura et al. | 310/88 |
| 5,336,954 A | * | 8/1994 | Shiroyama | 310/88 |
| 5,747,904 A | * | 5/1998 | Sudhoff et al. | 310/88 |
| 6,371,167 B1 | * | 4/2002 | Hosoya et al. | 138/177 |
| 2003/0220067 A1 | * | 11/2003 | Mashiko et al. | 454/254 |
| 2006/0267433 A1 | * | 11/2006 | Usami et al. | 310/89 |
| 2011/0016836 A1 | * | 1/2011 | Yano | 55/491 |
| 2012/0104888 A1 | * | 5/2012 | Kuwada | 310/89 |

FOREIGN PATENT DOCUMENTS

| | | |
|---|---|---|
| JP | A-04-150752 | 5/1992 |
| JP | A-8-162215 | 6/1996 |
| JP | A-2009-114940 | 5/2009 |
| WO | WO 2009122785 A1 * | 10/2009 |

OTHER PUBLICATIONS

Notification of Reasons for Rejection dated Mar. 4, 2014 from Japanese Patent Application No. 2010-243015 (with English-language translation).

* cited by examiner

*Primary Examiner* — John K Kim
(74) *Attorney, Agent, or Firm* — Oliff PLC (57) ABSTRACT

An electric rotating machine includes a casing having a through-hole and a drain member for draining water from the casing. The drain member has a mounting portion that includes hooks each having a proximal part and a distal part. The proximal part extends in the penetration direction of the through-hole. The distal part has a distal end that makes up an insertion end. The mounting portion is mounted to the through-hole by inserting the hooks into the through-hole from the insertion ends. The proximal parts of the hooks have flexibility so as to flex in a flexural direction perpendicular to the penetration direction during the insertion of the hooks into the through-hole. Each of the hooks also has a protrusion that protrudes from the outer surface of the proximal part toward the inner wall of the through-hole to restrict movement of the hook with respect to the through-hole.

5 Claims, 9 Drawing Sheets

FLEXURAL DIRECTION

FIG. 9B
(COMPARATIVE EXAMPLE)

FLEXURAL DIRECTION

DRAIN STRUCTURE OF ELECTRIC ROTATING MACHINE

CROSS-REFERENCE TO RELATED APPLICATION

This application is based on and claims priority from Japanese Patent Application No. 2010-243015, filed on Oct. 29, 2010, the content of which is hereby incorporated by reference in its entirety into this application.

BACKGROUND OF THE INVENTION

1. Technical Field of the Invention

The present invention relates to drain structures provided in casings of electric rotating machines.

2. Description of the Related Art

There are known electric rotating machines which have drain structures for draining water, which has intruded into a casing of the machine, from the inside to the outside of the casing (see, for example, Japanese Patent Application Publication No. H04-150752). In addition, electric rotating machines include, for example, electric motors and electric generators.

Figure 9A:
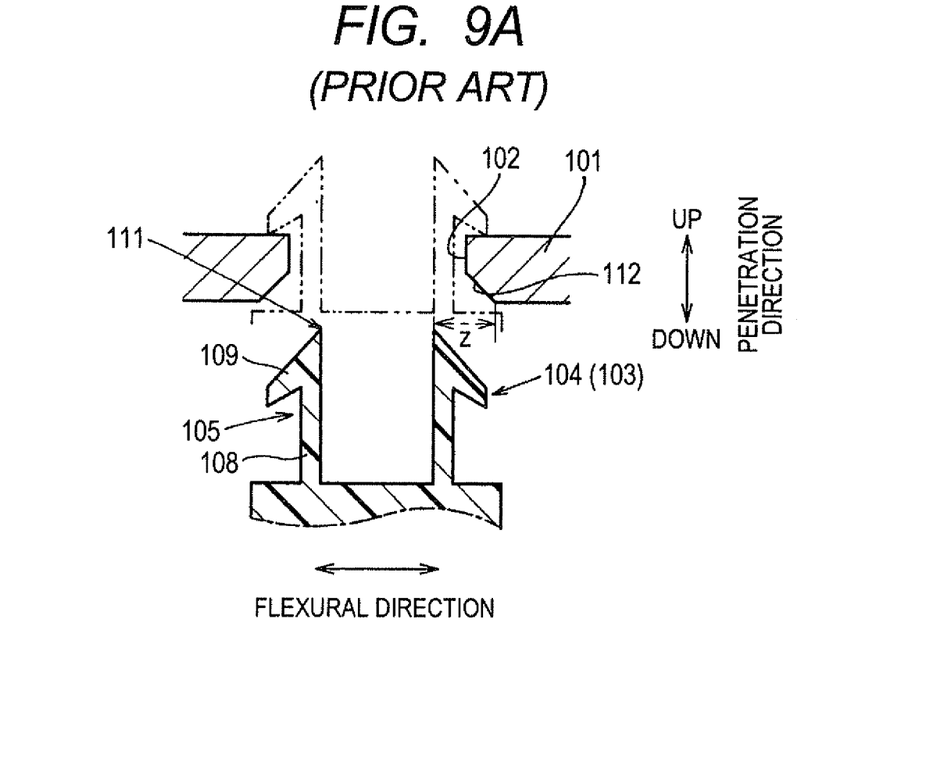
FIG. 9A is a cross-sectional view showing a drain structure according to the prior art.

FIG. 9A shows a conventional drain structure of a starter for starting an engine of a motor vehicle. As shown in the figure, the starter includes a casing 101 that has a through-hole 102 formed therein. To the through-hole 102, there is mounted a drain member 103.

Specifically, the drain member 103 includes a mounting portion 104 that extends in the penetration direction of the through-hole 102 of the casing 101. The mounting portion 104 has a pair of hooks 105 that are arranged so as to face each other in a direction perpendicular to the penetration direction of the through-hole 102. Each of the hooks 105 includes a proximal part 108 and a distal part 109. The proximal part 108 extends in the penetration direction of the through-hole 102. The distal part 109 has a distal end (or tip) 111 that is positioned furthest from the proximal part 108 and makes up an insertion end 111 of the mounting portion 104.

The mounting portion 104 of the drain member 103 is mounted to the through-hole 102 of the casing 101 by inserting the hooks 105 into the through-hole 102 from the outside of the casing 101. More specifically, during the insertion of the hooks 105 into the through-hole 102, the hooks 105 first flex so as to reduce the distance between them. After the distal parts 109 of the hooks 105 has passed through the through-hole 102, the hooks 105 return to their original shapes, and the distal parts 109 are caught on the inner surface of the casing 101 around the through-hole 102, as illustrated with two-dot chain lines in FIG. 9A.

Moreover, in the conventional drain structure, there is provided a chamfer 112 on the outer surface of the casing 101 around the through-hole 102. With the chamfer 112, the entrance of the through-hole 102 is widened with respect to the distance between the insertion ends 111 of the mounting portion 104 of the drain member 103. Consequently, even if the insertion ends 111 are deviated from their desired positions in the flexural direction of the hooks 104, it is still possible to insert the hooks 104 into the through-hole 102. That is, with the chamfer 112, the allowable amount z of positional deviation of the insertion ends 111 with respect to the through-hole 102 before the insertion of the hooks 105 into the through-hole 102 is increased.

Furthermore, to meet the recent cost-saving requirement, it is necessary to minimize the thickness of the casing 101. However, with the minimization of the thickness of the casing 101, it may become impossible to provide the chamfer 112 around the through-hole 102. Further, without the chamfer 112, the allowable amount z of positional deviation of the insertion ends 111 with respect to the through-hole 102 may be reduced. As a result, it may become necessary to accordingly improve the accuracy of mounting the drain member 103 to the through-hole 102, thereby increasing the manufacturing cost of the starter.

Therefore, it is desired to set large the allowable amount z of positional deviation of the insertion ends 111 with respect to the through-hole 102 without providing the chamfer 112.

Figure 9B:
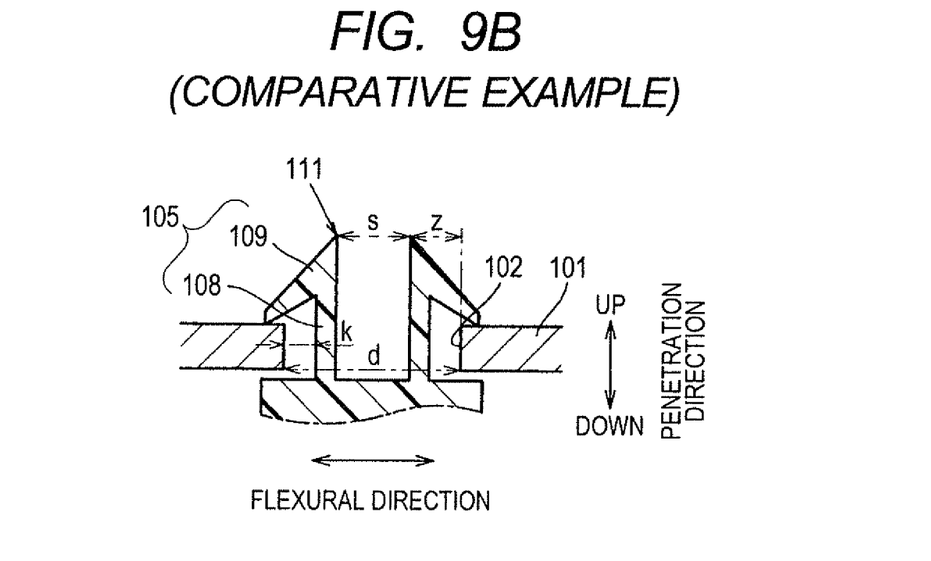
FIG. 9B is a cross-sectional view showing a drain structure according to a comparative example.

To meet the above desire, one may consider applying an alternative drain structure as shown in FIG. 9B. In this drain structure, the distance between the facing pair of the hooks 105 is reduced, thereby setting the distance s between the insertion ends 111 sufficiently smaller than the width d of the through-hole 102 on the outer surface of the casing 101.

However, with the above alternative drain structure, the distances between the proximal parts 108 of the hooks 105 and the inner wall of the through-hole 102 (i.e., the inner wall of the casing 101 which defines the through-hole 102) after the mounting of the mounting portion 104 of the drain member 103 to the through-hole 102 are increased. Thus, the allowable amount k of movement of the hooks 105 within the through-hole 102 after the mounting of the mounting portion 104 to the through-hole 102 is accordingly increased. Consequently, with the increase in the allowable amount k, it becomes easier for the hooks 105 to move within the through-hole 102 due to vibrations caused by, for example, operation of the starter or an external force. As a result, in the worst case, the distal parts 109 of the hooks 105, which are normally caught on the inner surface of the casing 101, will be detached from the inner surface.

In addition, if the thickness of the proximal parts 108 of the hooks 105 in the flexural direction of the hooks 105 is set too large, the hooks 105 may be easily damaged by stress concentration during the flexing of the hooks 105. Therefore, it is also desired to set small the thickness of the proximal parts 108 of the hooks 105 in the flexural direction of the hooks 105.

SUMMARY OF THE INVENTION

According to an embodiment, there is provided a first electric rotating machine which includes a casing having a through-hole and a drain member for draining water from the casing. The drain member has a mounting portion that is mounted to the through-hole of the casing. The mounting portion includes at least a pair of hooks that are arranged away from each other. Each of the hooks has a proximal part and a distal part. The proximal part extends in a penetration direction of the through-hole of the casing. The distal part has a distal end which is positioned furthest from the proximal part in the penetration direction and makes up an insertion end of the mounting portion. The proximal parts of the hooks have flexibility so as to flex in a flexural direction which is perpendicular to the penetration direction of the through-hole. The mounting portion of the drain member is mounted to the through-hole of the casing by inserting the hooks into the through-hole from the insertion ends. When passing through the through-hole, the distal parts of the hooks make contact with an inner wall of the through-hole, thereby causing the proximal parts to flex in the flexural direction so as to reduce the distance between the distal parts in the flexural direction. After the passing of the distal parts through the through-hole, the proximal parts return to their original shapes, and the distal parts are caught on an inner surface of the casing around the through-hole. Furthermore, each of the hooks of the drain member has a protrusion that protrudes from an outer surface of the proximal part of the hook toward the inner wall of the through-hole to restrict movement of the hook with respect to the through-hole.

According to another embodiment, there is provided a second electric rotating machine which includes a casing having a through-hole and a drain member for draining water from the casing. The drain member has a mounting portion that is mounted to the through-hole of the casing. The mounting portion includes at least a pair of hooks that are arranged away from each other. Each of the hooks has a proximal part and a distal part. The proximal part extends in a penetration direction of the through-hole of the casing. The distal part has a distal end which is positioned furthest from the proximal part in the penetration direction and makes up an insertion end of the mounting portion. The proximal parts of the hooks have flexibility so as to flex in a flexural direction which is perpendicular to the penetration direction of the through-hole. The mounting portion of the drain member is mounted to the through-hole of the casing by inserting the hooks into the through-hole from the insertion ends. When passing through the through-hole, the distal parts of the hooks make contact with an inner wall of the through-hole, thereby causing the proximal parts to flex in the flexural direction so as to reduce the distance between the distal parts in the flexural direction. After the passing of the distal parts through the through-hole, the proximal parts return to their original shapes, and the distal parts are caught on an inner surface of the casing around the through-hole. Furthermore, for each of the hooks of the drain member, the distal end of the distal part of the hook is positioned more inside the through-hole of the casing in the flexural direction than the proximal part of the hook is, and movement of the hook with respect to the through-hole is restricted by the proximal part of the hook.

With the above configurations of the first and second electric rotating machines, it is possible to set large the allowable amount of positional deviation of the insertion ends with respect to the through-hole before the insertion of the hooks into the through-hole, without providing a chamfer on the outer surface of the casing around the through-hole. Further, it is possible to restrict movement of the hooks with respect to the through-hole after the mounting of the mounting portion of the drain member to the through-hole. Furthermore, it is also possible to set small the thickness of the proximal parts of the hooks in the flexural direction.

According to further implementations, in the first electric rotating machine, for each of the hooks of the drain member, the distal end of the distal part of the hook is preferably positioned more inside the through-hole of the casing in the flexural direction than the proximal part of the hook is.

In the second electric rotating machine, for each of the hooks of the drain member, the distal part has an inner protrusion which protrudes from an inner surface of the proximal part inward in the flexural direction and which includes the distal end of the distal part.

Further, the hooks are preferably configured so that the inner protrusions of the distal parts of the hooks are brought into a protrusion-recess engagement when the hooks maximally flex during the insertion thereof into the through-hole of the casing.

In the first and second electric rotating machines, the hooks of the drain member are preferably arranged so as not to overlap each other in the flexural direction.

In the first and second electric rotating machines, for each of the hooks of the drain member, the distal part of the hook also has a proximal end which is opposite to the distal end of the distal part in the penetration direction of the through-hole and which is positioned furthest from the proximal part of the hook in the flexural direction. The proximal ends of the distal parts of the hooks make up catch ends of the mounting portion which are caught on the inner surface of the casing around the through-hole after the mounting of the mounting portion to the through-hole. The distal parts of the hooks preferably also have flexibility so as to flex in a direction to reduce the distance between the catch ends during the insertion of the hooks into the through-hole.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention and modifications thereof will be described hereinafter with reference to FIGS. 1-8C. It should be noted that for the sake of clarity and understanding, identical components having identical functions in different embodiments and modifications have been marked, where possible, with the same reference numerals in each of the figures and that for the sake of avoiding redundancy, descriptions of the identical components will not be repeated.

First Embodiment

Figure 1:
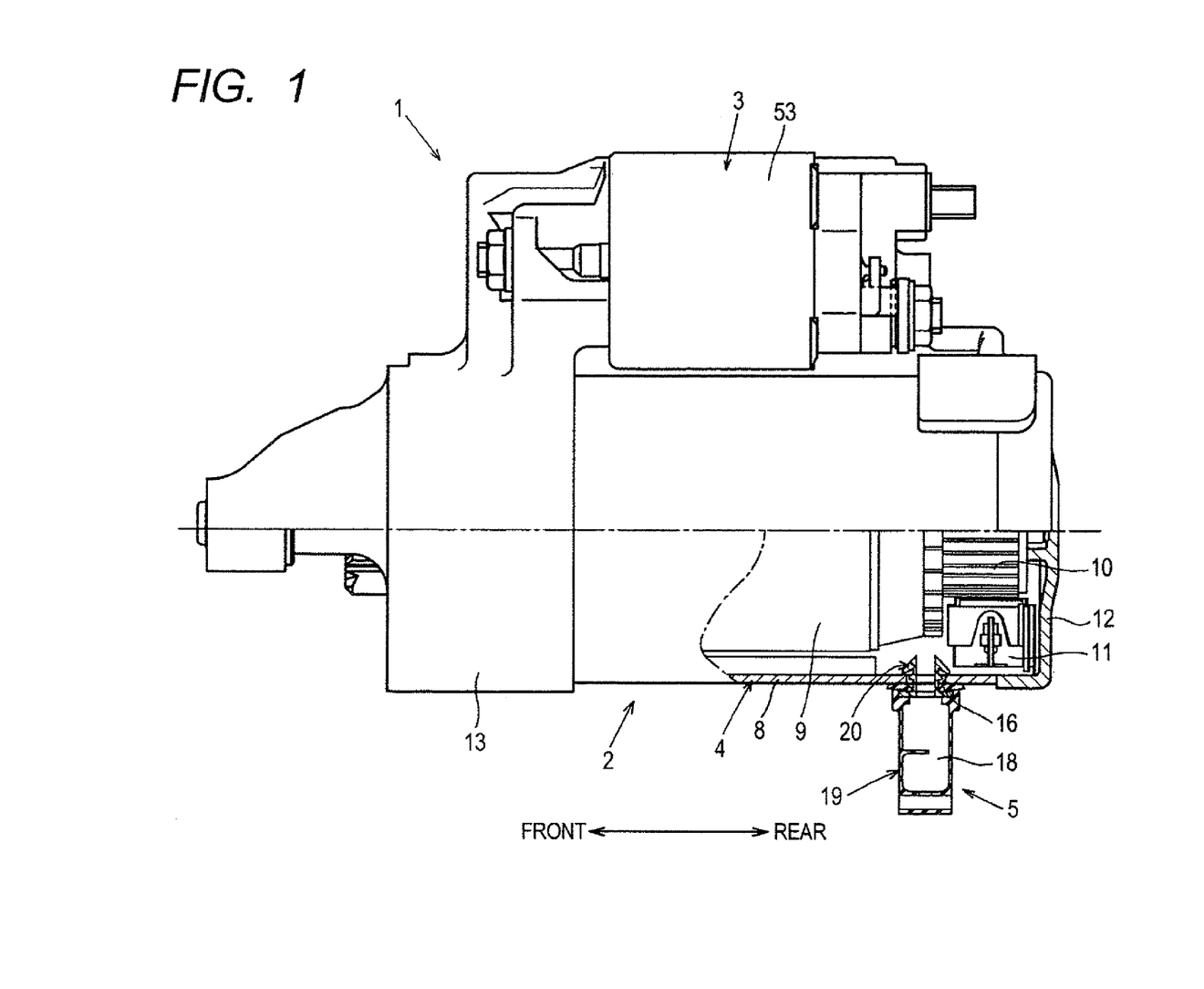
FIG. 1 is a partially cross-sectional schematic view showing the overall configuration of an engine starter which includes a drain structure according to a first embodiment of the invention.

FIG. 1 shows the overall configuration of a starter 1 for starting an engine of a motor vehicle; the starter 1 includes a drain structure according to a first embodiment of the invention.

The starter 1 is of a well-known type. As shown in FIG. 1, the starter 1 includes a motor 2 for generating torque and an electromagnetic switch 3 for controlling supply of electric power to the motor 2.

The motor 2 includes: a field (not shown) that is configured by arranging a plurality of permanent magnets (not shown) on the inner surface of a yoke 8; an armature 9 that is rotatably disposed inside of the field; and a plurality of brushes 11 that are arranged to make sliding contact with a commutator 10 provided on the armature 9. In operation, upon supply of electric power to the armature 9 via the sliding contact between the commutator 10 and the brushes 11, the armature 9 is rotated by an electromagnetic force created by the field, thereby generating torque.

The motor 2 also includes a casing 4 which is comprised of the yoke 8 and an end frame 12. The casing 4 is fixed to a front housing 13 of the starter 1 via a plurality of through-bolts (not shown).

The yoke 8 has a substantially hollow cylindrical shape and is held between the front housing 13 and the end frame 12.

The end frame 12 is arranged to close a rear open end of the yoke 8. The end frame 12 also receives therein part of the commutator 10 and brushes 11.

Moreover, in the present embodiment, the yoke 8 has a rectangular through-hole 16 that is formed in a rear part of a side wall of the yoke 8 so as to penetrate the side wall. The through-hole 16 is provided for mounting a drain member 5 to the casing 4 of the motor 2. In addition, the through-hole 16 is positioned so as to face the ground and not to interfere with any components (e.g., the brushes 11) of the motor 2.

It should be noted that in the present embodiment, the rear part of the side wall of the yoke 8, in which the through-hole 16 is formed, has the same thickness as other parts of the side wall. Further, in the present embodiment, the thickness of the side wall of the yoke 8 is set so small that it is difficult to provide a chamfer around the through-hole 16.

Figure 2:
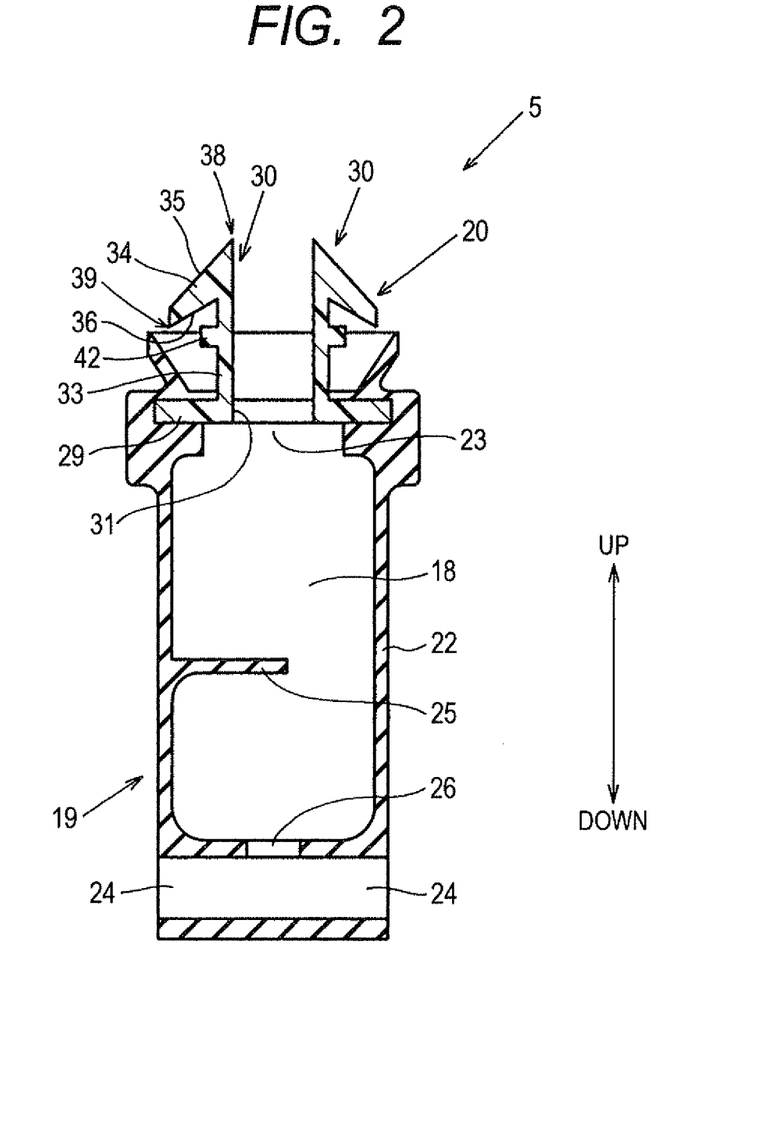
FIG. 2 is a cross-sectional view of a drain member employed in the drain structure according to the first embodiment.

Referring now to FIG. 2, in the present embodiment, the drain member 5 is configured to have a drain portion 19, in which a drain passage 18 is formed, and a mounting portion 20 for mounting the drain member 5 to the through-hole 16 of the yoke 8 of the motor 2.

Specifically, in the present embodiment, the drain portion 19 is made up of a cylindrical drain tube 22. Within the drain tube 22, there is formed the drain passage 18 so as to extend in the longitudinal direction of the drain tube 22. The drain passage 18 has an inlet 23 and a pair of outlets 24. The inlet 23 opens on the upper end of the drain tube 22. The outlets 24 open, respectively on opposite side, on a lower part of the side surface of the drain tube 22 and both fluidically communicate with the inlet 23. The drain tube 22 also has a baffle plate 25 and an orifice (or small opening) 26 formed therein. The baffle plate 25 and the orifice 26 together form a labyrinth structure in the drain tube 22:

Consequently, with the labyrinth structure, it is possible to drain water, which has intruded into the casing 4 of the motor 2, via the drain passage 18 while blocking water from intruding into the casing 4 via the drain passage 18.

Figure 3A:
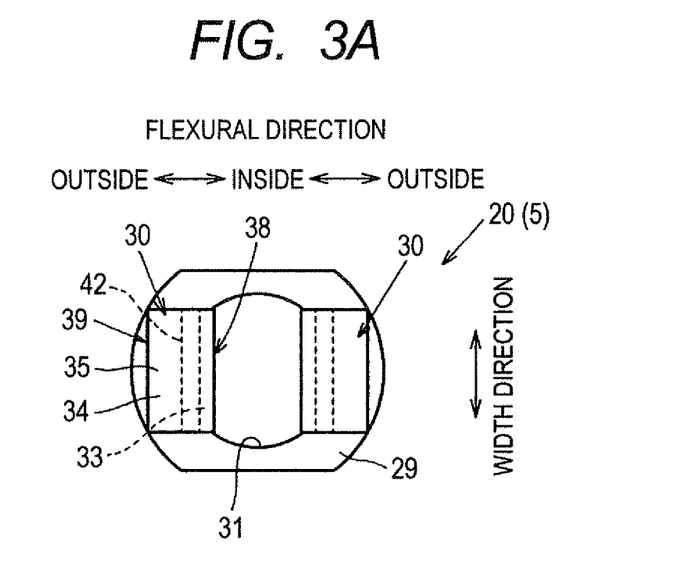
FIG. 3A is a top view of a mounting portion of the drain member.
Figure 3B:
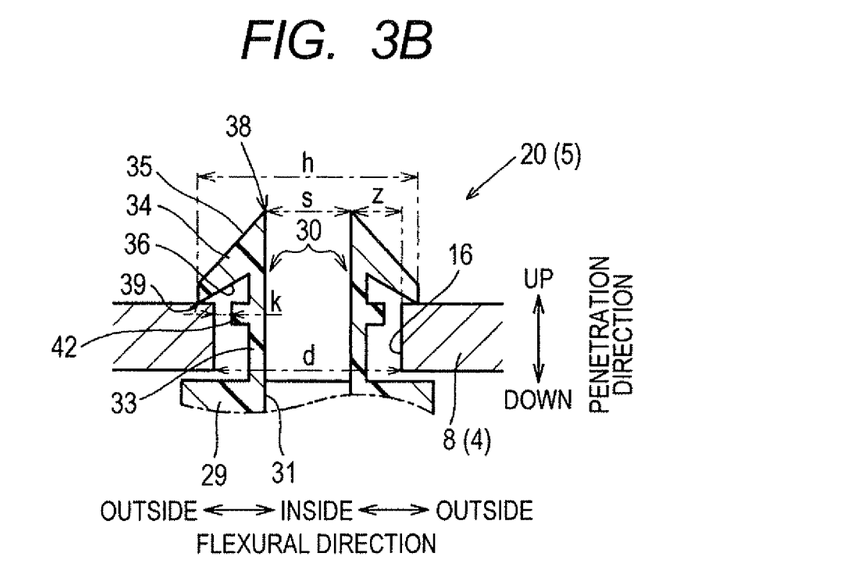
FIG. 3B is an enlarged cross-sectional view showing the drain structure according to the first embodiment.

Referring further to FIGS. 3A and 3B, the mounting portion 20 includes a seat 29 and a plurality (e.g., one pair in the present embodiment) of hooks 30 that protrude from the seat 29 upward (i.e., toward the through-hole 16 of the yoke 8 of the motor 2 in the penetration direction of the through-hole 16). In addition, the mounting portion 20 is made of, for example, resin.

The seat 29 has the shape of a substantially elliptical plate, as shown in FIG. 3A. The lower end face of the seat 29 abuts the draining portion 19; from the upper end face of the seat 29, the hooks 30 protrude. Moreover, at the center of the seat 29, there is formed a through-hole 31 that penetrates the seat 29 in the thickness direction thereof so as to fluidically connect the inside of the casing 4 with the drain passage 18.

The hooks 30 are formed on the seat 29 so as to face each other with the through-hole 31 interposed therebetween. Each of the hooks 30 has a proximal part 33 that extends from the seat 29 upward (i.e., toward the through-hole 16 of the yoke 8 of the motor 2 in the penetration direction of the through-hole 16) and a distal part 34 formed on the upper side of the proximal part 33 (i.e., on the opposite side of the proximal part 33 to the seat 29 in the penetration direction of the through-hole 16).

The proximal parts 33 of the hooks 30 have flexibility so that they can flex in a direction to reduce the distance between the distal parts 34. The flexural direction of the proximal parts 33 is perpendicular to both the penetration direction of the through-hole 16 of the yoke 8 of the motor 2 (i.e., the vertical direction) and the width direction of the hooks 30. Moreover, as shown in FIG. 3A, the proximal parts 33 of the hooks 30 each have a rectangular cross section the longitudinal direction of which coincides with the width direction of the hooks 30. Further, the thickness of each of the proximal parts 33 in the flexural direction is constant from the lower end (i.e., the seat 29-side end) to the upper end (i.e., the distal part 34-side end) of the proximal part 33.

In addition, in the present embodiment, as shown in FIG. 3A, the hooks 30 are arranged at the same position in the width direction of the hooks 30. Consequently, the hooks 30 overlap each other in the flexural direction.

For each of the hooks 30, the distal part 34 is formed so as to protrude from the proximal part 33 outward in the flexural direction (i.e., in the direction away from the other hook 30). The distal part 34 has a distal end (or tip) 38 and a proximal end (or barb) 39. The distal end 38 is positioned furthest from the proximal part 33 in the penetration direction of the through-hole 16 of the yoke 8 of the motor 2 and falls on the same plane as the inner surface of the proximal part 33. The proximal end 39 is positioned closest to the seat 29 in the penetration direction of the through-hole 16 and furthest from the proximal part 33 in the flexural direction. Moreover, the distal part 34 also has a top surface 35 and an under surface 36. The top surface 35 extends from the distal end 38 outward so as to be inclined toward the seat 29. The under surface 36 extends so as to make an acute angle with the outer surface of the proximal part 33 and be inclined toward the seat 29.

The distal ends 38 of the distal parts 34 of the hooks 30 make up insertion ends 38 of the mounting portion 20 of the drain member 5; the mounting portion 20 is inserted into the through-hole 16 of the yoke 8 of the motor 2 from the insertion ends 38. On the other hand, the proximal ends 39 of the distal parts 34 make up catch ends 39 of the mounting portion 20; the catch ends 39 are caught on the inner surface of the yoke 8 after the mounting of the mounting portion 20 to the through-hole 16 of the yoke 8.

The width s of the mounting portion 20 of the drain member 5 in the flexural direction at the distal end of the mounting portion 20 is represented by the distance between the insertion ends 38 when the proximal parts 33 of the hooks 30 are in a natural state (or undeformed state). In the present embodiment, the distance between the proximal parts 33 of the hooks 30 is set so small as to make the width s of the mounting portion 20 sufficiently smaller than the width d of the through-hole 16 of the yoke 8 in the flexural direction at the entrance of the through-hole 16.

Moreover, in the present embodiment, the distance h between the catch ends 39 of the mounting portion 20 of the drain member 5 is set greater than the width d of the through-hole 16 of the yoke 8 in the flexural direction at the exit of the through-hole 16.

In addition, in the present embodiment, there is provided no chamfer around the through-hole 16 of the yoke 8; the width d of the through-hole 16 is constant in the penetration direction of the through-hole 16 over the entire thickness of the side wall of the yoke 8. That is, the width d of the through-hole 16 at the entrance is equal to that at the exit.

The distal parts 34 of the hooks 30 have flexibility so that they can flex in a direction to reduce the distance h between the catch ends 39, in other words, in a direction to reduce the acute angles between the under surfaces 36 of the distal parts 34 and the outer surfaces of the proximal parts 33 of the hooks 30.

The drain member 5 is mounted to the through-hole 16 of the yoke 8 of the motor 2 in the following way.

First, the mounting portion 20 of the drain member 5 is inserted, from the insertion ends 38 thereof, into the entrance of the through-hole 16 of the yoke 8. At this stage, since the width s of the mounting portion 20 at the insertion ends 38 is smaller than the width d of the through-hole 16 at the entrance, the distal parts 34 of the hooks 30 can be inserted into the through-hole 16 without interfering with the inner wall of the through-hole 16 (i.e., the inner wall of the yoke 8 which defines the through-hole 16). However, with further insertion of the mounting portion 20 into the through-hole 16, the top surfaces 35 of the distal parts 34 of the hooks 30 come to make contact with the inner wall of the through-hole 16, causing the proximal parts 33 and distal parts 34 of the hooks 30 to flex and thereby allowing the distal parts 33 to pass through the through-hole 16. Then, upon the complete passing of the distal parts 33 through the through-hole 16, the hooks 30 return to (or restore) their original shapes, causing the catch ends 39 of the mounting portion 20 to be caught on the inner surface of the yoke 8.

Next, the outstanding features of the drain structure according to the present embodiment will be described.

In the present embodiment, each of the hooks 30 of the drain member 5 has a protrusion 42 that protrudes from the outer surface of the proximal part 33 toward the inner wall of the through-hole 16 of the yoke 8. The protrusion 42 is provided to restrict movement of the hook 30 with respect to the through-hole 16.

Specifically, referring to FIGS. 3A and 3B, for each of the hooks 30, the protrusion 42 is formed on the outer surface of the proximal part 33 so as to protrude toward the inner wall of the through-hole 16. Further, the protrusion 42 extends in the width direction of the hooks 30 so as to have the shape of a band that has a rectangular cross section perpendicular to the width direction.

It should be noted that the protrusions 42 of the hooks 30 may also have other shapes. For example, the protrusions 42 may be formed to extend in the penetration direction of the through-hole 16.

In addition, in terms of the flexural characteristics of the proximal parts 33 of the hooks 30, the protrusions 42 are preferably formed closer to the upper ends (i.e., the distal part 34-side ends) than the lower ends (i.e., the seat 29-side ends) of the proximal parts 33. Further, the protrusions 42 are positioned in the penetration direction of the through-hole 16 so as not to interfere with the flexing of the distal parts 34 during the insertion of the hooks 30 into the through-hole 16.

Furthermore, in the present embodiment, the distances between the protrusions 42 of the hooks 30 and the inner wall of the through-hole 16 are set so that the catch ends 39 can remain caught on the inner surface of the yoke 8 even when the hooks 30 move in the flexural direction within the through-hole 16. That is, the distances between the protrusions 42 and the inner wall of the through-hole 16 represent the allowable amount k of movement of the hooks 30 in the flexural direction within the through-hole 16. Consequently, in the present embodiment, movement of the hooks 30 in the flexural direction within the through-hole 16 is restricted, by the protrusions 42, to the allowable amount k.

In addition, as described above, in the present embodiment, the width s of the mounting portion 20 of the drain member 5 at the insertion ends 38 is set sufficiently smaller than the width d of the through-hole 16 at the entrance thereof by setting the distance between the proximal parts 33 of the hooks 30 small.

Further, the thickness of the proximal parts 33 of the hooks 30 in the flexural direction is set so small that during the insertion of the hooks 30 into the through-hole 16, the proximal parts 33 can easily flex without being damaged by stress concentration.

The drain structure according to the present embodiment has the following advantages.

In the present embodiment, the allowable amount k of movement of the hooks 30 in the flexural direction within the through-hole 16 is determined by the distances between the protrusions 42 and the inner wall of the through-hole 16.

Therefore, the positions of the distal parts 34 of the hooks 30 and the thickness of the proximal parts 33 of the hooks 30 in the flexural direction can be suitably set without being constrained by the setting of the allowable amount k.

Specifically, without being constrained by the setting of the allowable amount k, it is possible to set the width s of the mounting portion 20 at the insertion ends 38 sufficiently smaller than the width d of the through-hole 16 at the entrance by setting the distance between the proximal parts 33 of the hooks 30 small. Consequently, referring to FIG. 3B, it becomes possible to set large the allowable amount z of positional deviation of the insertion ends 38 with respect to the through-hole 16 before the insertion of the hooks 30 into the through-hole 16, without providing a chamfer on the outer surface of the yoke 8 around the through-hole 16.

Further, the allowable amount k of movement of the hooks 30 in the flexural direction within the through-hole 16 can be set to any desired value by properly setting the distances between the protrusions 42 and the inner wall of the through-hole 16. Accordingly, it is possible to effectively restrict movement of the hooks 30 in the flexural direction within the through-hole 16 by properly setting the distances between the protrusions 42 and the inner wall of the through-hole 16.

Furthermore, without being constrained by the setting of the allowable amount k, it is possible to set small the thickness of the proximal parts 33 of the hooks 30 in the flexural direction. Consequently, with the small thickness in the flexural direction, the proximal parts 33 can easily flex without being damaged by stress concentration during the insertion of the hooks 30 into the through-hole 16.

Moreover, in the present embodiment, the distal parts 34 of the hooks 30 have flexibility so that they can flex in a direction to reduce the distance h between the catch ends 39.

Consequently, even if the distance h between the catch ends 39 is set large, it is still possible to insert the hooks 30 into the through-hole 16 by the flexing of the distal parts 34 as well as by the flexing of the proximal parts 33.

That is to say, by virtue of the flexibility of the distal parts 34, it is possible to set the distance h between the catch ends 39 large. Consequently, with the large distance h, the catch ends 39 can be reliably caught on the inner surface of the yoke 8 even when the allowable amount k of movement of the hooks 30 within the through-hole 16 is set large.

In addition, if the distal parts 34 of the hooks 30 have no flexibility and the distance h between the catch ends 39 is set large, it would be impossible to insert the hooks 30 into the through-hole 16 only by the flexing of the proximal parts 33.

Second Embodiment

This embodiment illustrates a drain structure which is similar to the drain structure according to the first embodiment; accordingly, only the differences therebetween will be described hereinafter.

Figure 4A:
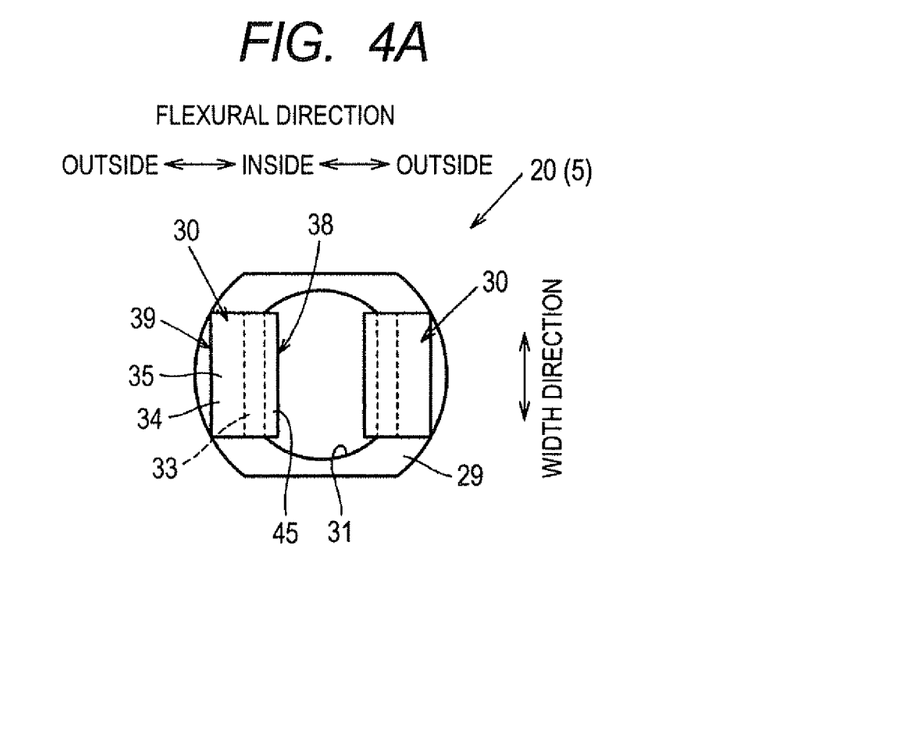
FIG. 4A is a top view of a mounting portion of a drain member employed in a drain structure according to a second embodiment of the invention.
Figure 4B:
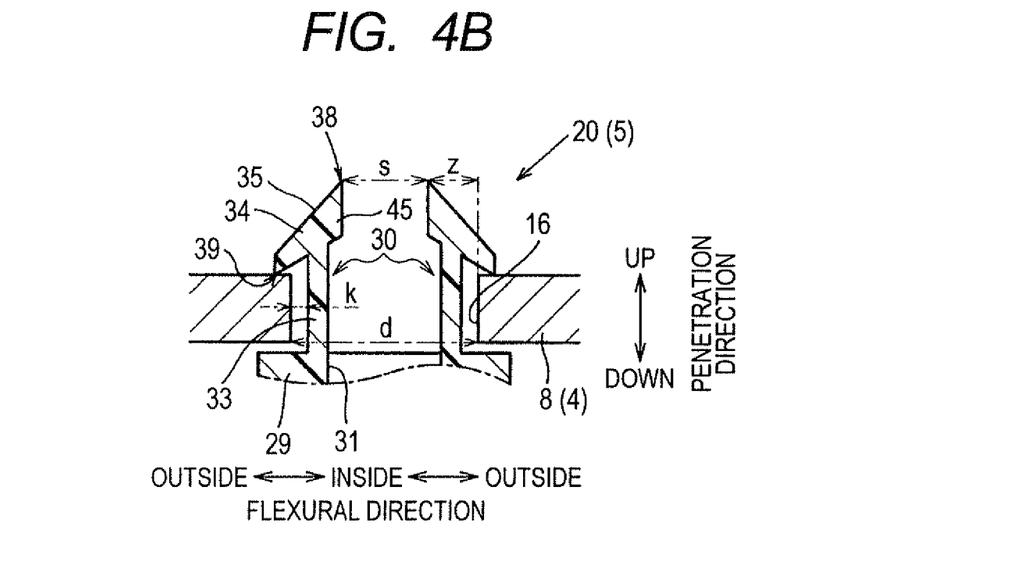
FIG. 4B is a cross-sectional view showing the drain structure according to the second embodiment.

Referring to FIGS. 4A and 4B, in the present embodiment, for each of the hooks 30, the distal part 34 protrudes from the proximal part 33 both outward and inward in the flexural direction. Consequently, there is formed an inner protrusion 45 which protrudes from the inner surface of the proximal part 33 inward in the flexural direction and which includes the distal end 38 of the distal part 34 (i.e., the insertion end 38).

As a result, in the present embodiment, for each of the hooks 30, the distal end 38 of the distal part 34 is positioned inward of the proximal part 33 in the flexural direction, in other words, is positioned more inside the through-hole 16 in the flexural direction than the proximal part 33 is. In addition, as in the first embodiment, the top surface 35 of the distal part 34 extends from the distal end 38 outward so as to be inclined toward the seat 29.

Moreover, in the present embodiment, there are no protrusions formed on the outer surfaces of the proximal parts 33 of the hooks 30. Further, the distances between the outer surfaces of the proximal parts 33 and the inner wall of the through-hole 16 are set so that the catch ends 39 can remain caught on the inner surface of the yoke 8 even when the hooks 30 move in the flexural direction within the through-hole 16. That is, the distances between the outer surfaces of the proximal parts 33 and the inner wall of the through-hole 16 represent the allowable amount k of movement of the hooks 30 in the flexural direction within the through-hole 16. Consequently, in the present embodiment, movement of the hooks 30 in the flexural direction within the through-hole 16 is restricted, by the proximal parts 33, to the allowable amount k.

Furthermore, in the present embodiment, the width s of the mounting portion 20 of the drain member 5 at the insertion ends 38 is set sufficiently smaller than the width d of the through-hole 16 at the entrance thereof by setting the distance between the inner protrusions 45 small.

Moreover, in the present embodiment, the thickness of the proximal parts 33 of the hooks 30 in the flexural direction is set so small that during the insertion of the hooks 30 into the through-hole 16, the proximal parts 33 can easily flex without being damaged by stress concentration.

In addition, in the present embodiment, the distal parts 34 of the hooks 30 also have flexibility so that they can flex in a direction to reduce the distance h between the catch ends 39 during the insertion of the hooks 30 into the through-hole 16 of the yoke 8.

Accordingly, compared to the first embodiment, in the present embodiment, the protrusions 42 are omitted from the hooks 30; the relative position between the distal parts 34 of the hooks 30 and the through-hole 16 of the yoke 8 is maintained; and the positions of the proximal parts 33 of the hooks 30 are shifted outward (i.e., toward the inner wall of the through-hole 16) in the flexural direction.

The drain structure according to the present embodiment has the following advantages.

In the present embodiment, the distal ends (i.e., the insertion ends) 38 of the distal parts 34 of the hooks 30 are positioned more inside the through-hole 16 of the yoke 8 in the flexural direction than the respective proximal parts 33 are. Consequently, it becomes possible to set the width s of the mounting portion 20 at the insertion ends 38 sufficiently smaller than the width d of the through-hole 16 at the entrance thereof, regardless of the position and thickness of the proximal parts 33.

As a result, it becomes possible to set large the allowable amount z of positional deviation of the insertion ends 38 with respect to the through-hole 16 before the insertion of the hooks 30 into the through-hole 16, without providing a chamfer on the outer surface of the yoke 8 around the through-hole 16.

Moreover, since the allowable amount z is determined only by the distance between the distal ends 38 of the distal parts 34, it is possible to set the allowable amount k of movement of the hooks 30 in the flexural direction within the through-hole 16 to any desired value by properly setting the distances between the outer surfaces of the proximal parts 33 and the inner wall of the through-hole 16. In other words, without being constrained by the setting of the allowable amount z, it is possible to position the proximal parts 33 close to the inner wall of the through-hole 16, thereby restricting movement of the hooks 30 in the flexural direction within the through-hole 16 by means of contact between the outer surfaces of the proximal parts 33 and the inner wall of the through-hole 16.

Furthermore, since the inner surfaces of the proximal parts 33 of the hooks 30 are positioned outward (i.e., toward the inner wall of the through-hole 16) of the respective insertion ends 38, it is possible to set small the thickness of the proximal parts 33 in the flexural direction. Consequently, with the small thickness in the flexural direction, the proximal parts 33 can easily flex without being damaged by stress concentration during the insertion of the hooks 30 into the through-hole 16.

Modification of Second Embodiment

In the previous embodiment, the distal ends 38 of the distal parts 34 of the hooks 30 are positioned more inside the through-hole 16 in the flexural direction than the respective proximal parts 30 are, by configuring the hooks 30 to have the inner protrusions 42 which include the respective distal ends 38.

Figure 5:
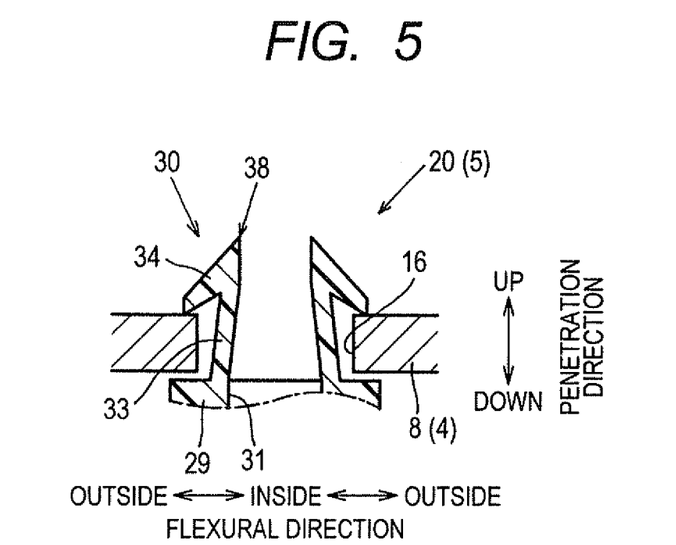
FIG. 5 is a cross-sectional view showing a drain structure according to a modification of the second embodiment.

In comparison, referring to FIG. 5, in this modification, each of the hooks 30 has no inner protrusion 45 formed therein. Instead, for each of the hooks 30, the proximal part 33 is inclined with respect to the penetration direction of the through-hole 16 so that the proximal part 33 is closer to the inner wall of the through-hole 16 on the seat 29-side than on the distal part 34-side. Consequently, the distal end 38 of the distal part 34 is positioned more inside the through-hole 16 in the flexural direction than the seat 29-side end of the proximal part 33.

With the above modified drain structure, it is also possible to achieve the same advantages as with the drain structure according to the previous embodiment.

Third Embodiment

This embodiment illustrates a drain structure which is similar to the drain structure according to the first embodiment; accordingly, only the differences therebetween will be described hereinafter.

As described previously, in the first embodiment, as shown in FIG. 3A, the hooks 30 are arranged at the same position in the width direction of the hooks 30. Consequently, the hooks 30 overlap each other in the flexural direction.

Figure 6A:
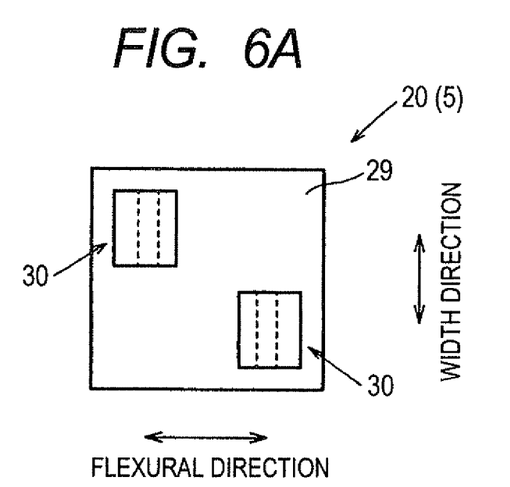
FIG. 6A is a top view of a mounting portion of a drain member employed in a drain structure according to a third embodiment of the invention.
Figure 6B:
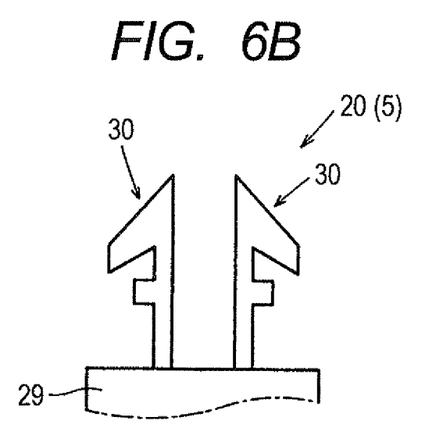
FIG. 6B is a front view of the mounting portion of the drain member shown in FIG. 6A.

In comparison, in the present embodiment, as shown in FIGS. 6A and 6B, the hooks 30 are arranged at different positions in the width direction of the hooks 30. Consequently, the hooks 30 do not overlap each other in the flexural direction.

More specifically, in the present embodiment, the hooks 30 are arranged so as to face each other in a diagonal direction of the seat 29 of the mounting portion 20.

With the above arrangement of the hooks 30, it is possible to increase the amount of flexure of the hooks 30 during the insertion thereof into the through-hole 16 of the yoke 8.

Fourth Embodiment

This embodiment illustrates a drain structure which is similar to the drain structure according to the second embodiment; accordingly, only the differences therebetween will be described hereinafter.

Figure 7A:
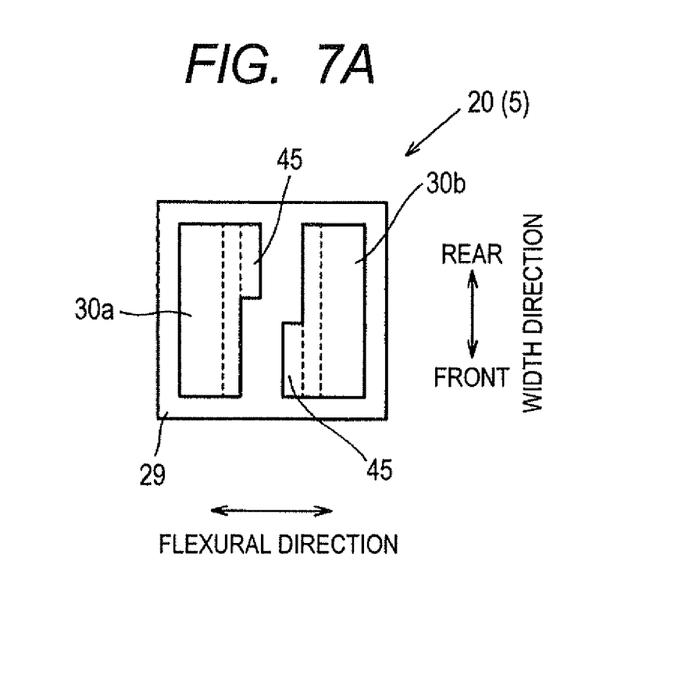
FIG. 7A is a top view of a mounting portion of a drain member employed in a drain structure according to a fourth embodiment of the invention.
Figure 7B:
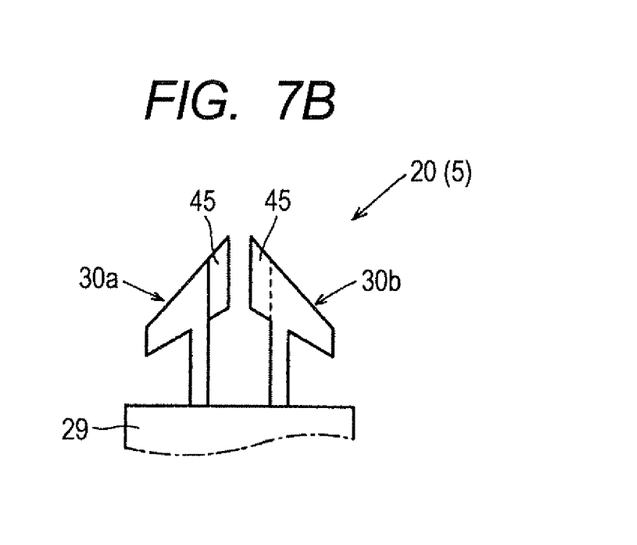
FIG. 7B is a front view of the mounting portion of the drain member shown in FIG. 7A.

Referring to FIGS. 7A and 7B, in the present embodiment, the hooks 30 are configured so that the inner protrusions 45 of the hooks 30 are brought into a protrusion-recess engagement when the hooks 30 maximally flex during the insertion thereof into the through-hole 16 of the yoke 8.

More specifically, in one of the hooks 30 (i.e., the left hook 30a in FIG. 7A), the inner protrusion 45 is formed only on one end side (i.e., the rear end side in FIG. 7A) in the width direction of the hooks 30. On the other hand, in the other hook 30 (i.e., the right hook 30b in FIG. 7A), the inner protrusion 45 is formed only on the other end side (i.e., the front end side in FIG. 7A) in the width direction of the hooks 30. Consequently, the inner protrusions 45 of the hooks 30 do not overlap each other in the flexural direction.

With the above configuration of the hooks 30, when the hooks 30 maximally flex during the insertion thereof into the through-hole 16 of the yoke 8, the inner protrusion 45 of the left hook 30a is moved rightward into a recess formed behind the inner protrusion 45 of the right hook 30b, and the inner protrusion 45 of the right hook 30b is moved leftward into a recess formed in front of the inner protrusion 45 of the left hook 30a.

Consequently, with the above protrusion-recess engagement between the inner protrusions 45, it is possible to increase the amount of flexure of the hooks 30 during the insertion thereof into the through-hole 16 by the distance of the engagement (i.e., the protruding height of the inner protrusions 45 in the present embodiment).

While the above particular embodiments and modifications have been shown and described, it will be understood by those skilled in the art that various further modifications, changes, and improvements may be made without departing from the spirit of the invention.

For example, in the first to the fourth embodiments, the drain structures according to the invention are applied to the starter 1. However, the drain structures according to the invention can also be applied to other electric rotating machines, such as electric generators and various other types of electric motors.

Moreover, in the first to the fourth embodiments, the drain structures according to the invention are provided in the casing 4, more specifically in the yoke 8 of the motor 2. However, in a broad sense, the drain structures according to the invention are provided in a casing of the starter 1 which includes a casing 53 of the electromagnetic switch 3 (see FIG. 1) as well as the casing 4 of the motor 2.

That is to say, the drain structures according to the invention can also be provided in the casing 53 of the electromagnetic switch 3.

In the first to the fourth embodiments, the mounting portion 20 of the drain member 5 includes a pair of the hooks 30. However, the mounting portion 20 can also include more than two hooks 30. For example, the through-hole 16 of the yoke 8 may be configured as a circular through-hole, and the mounting portion 20 may include a plurality of pairs of hooks 30 arranged along the circumferential direction of the through-hole 16. Further, in this case, each pair of the hooks 30 may be arranged so as to face each other in the direction of a diameter of the through-hole 16.

In the first embodiment, the drain portion 19 of the drain member 5 is made up of the cylindrical drain tube 22 which has the drain passage 18 formed therein. However, the drain portion 19 can also be configured in different manners. For example, as shown in FIG. 8A-8C, the seat 29 may be configured as a rectangular plate having no through-hole 31 formed therein; the drain passage 18 may be formed on the top surface of the seat 29; and thus the drain portion 19 may be made up of part of the seat 29.

Figure 8A:
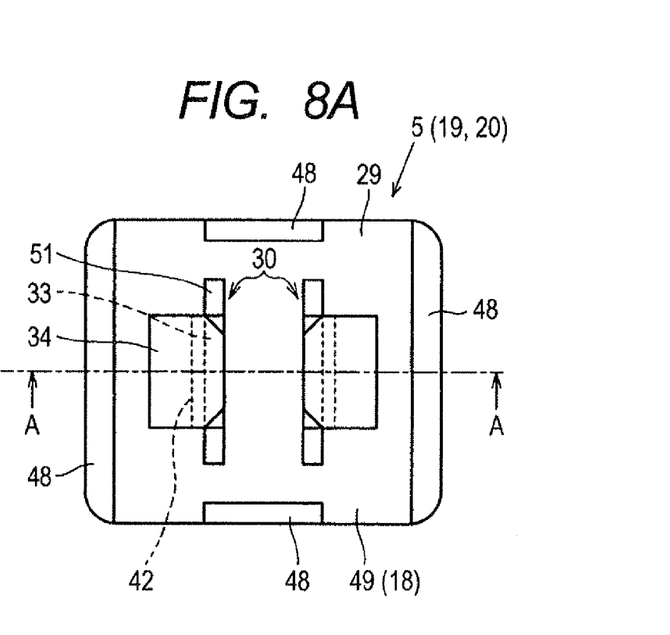
FIG. 8A is a top view of a drain member according to a modification of the first embodiment.
Figure 8B:
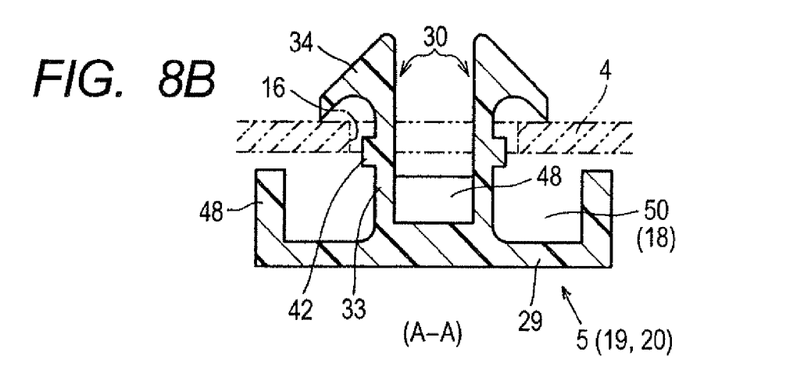
FIG. 8B is a cross-sectional view taken along the line A-A in FIG. 8A.
Figure 8C:
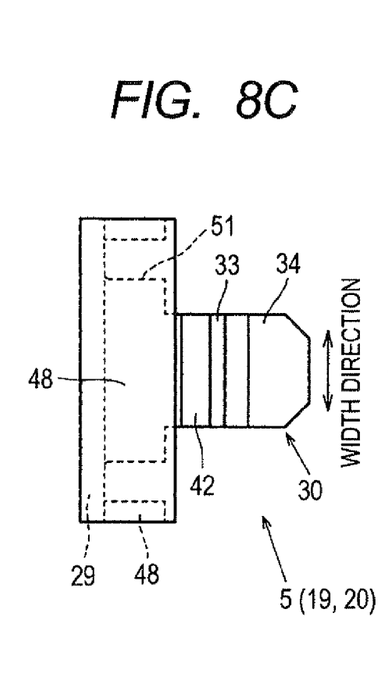
FIG. 8C is a side view of the drain member shown in FIG. 8A.

More specifically, in the modification shown in FIGS. 8A-8C, four vertical plates 48 are respectively provided on the four sides of the seat 29 so as to protrude upward from the top surface of the seat 29 with gaps 49 formed between the plates 48. Moreover, between the top surface of the seat 29 and the outer surface of the casing 4, there is also formed a gap 50. All of the gaps 49 and 50 together make up the drain passage 18 which fluidically communicate with the inside of the casing 4.

Consequently, water, which has intruded into the casing 4, can be drained out of the casing 4 via the gaps formed between the inner wall of the through-hole 16 and the hooks 30, reaching the top surface of the seat 29. Then, the water is further drained from the top surface of the seat 29 to the outside of the seat 29 via the drain passage 18.

In addition, in this modification, the seat 29 and the vertical plates 48 together block water from intruding into the casing 4 via through-hole 16. Moreover, for each of the proximal parts 33 of the hooks 30, there is provided, on the seat 29 side, a support 51 which has a greater width than the proximal part 33. Consequently, with the supports 51, the strength of the proximal parts 33 of the hooks 30 on the seat 29 side is enhanced.

Moreover, the drain structures according to the first to the fourth embodiments may be combined in any suitable ways. For example, in the drain structure according to the first embodiment, each of the distal parts 34 of the hooks 30 may be modified to further include an inner protrusion 45 as in the second embodiment, thereby positioning the distal ends 38 of the distal parts 34 more inside the through-hole 16 in the flexural direction than the respective proximal parts 33 are. Consequently, it becomes possible to reduce the width s of the mounting portion 20 at the insertion ends 38, thereby increasing the allowable amount z of positional deviation of the insertion ends 38 with respect to the through-hole 16 before the insertion of the hooks 30 into the through-hole 16.

In addition, in the first to the fourth embodiments, if the yoke 8 of the motor 2 is modified to have a sufficiently large thickness, it is also possible to provide a chamber on the outer surface of the yoke 8 around the through-hole 16.

What is claimed is:

1. An electric rotating machine comprising:
   a casing having a through-hole (1) that penetrates the casing in a penetration direction, the penetration direction being a bottom-top direction, and (2) through which an internal space of the casing communicates with an external space; and
   a drain member configured to drain water from the internal space of the casing to the external space,
   wherein
   the drain member has a mounting portion that is mounted to the through-hole of the casing,
   the mounting portion includes at least a pair of hooks that are arranged away from each other,
   each of the hooks has a proximal part and a distal part, the proximal part extending in the penetration direction of the through-hole of the casing, the distal part having a distal end which is positioned furthest from the proximal part in the penetration direction and makes up an insertion end of the mounting portion,
   the proximal parts of the hooks have flexibility so as to flex in a flexural direction which is perpendicular to the penetration direction of the through-hole,
   wherein
   the mounting portion of the drain member is mounted to the through-hole of the casing by inserting the hooks into the through-hole in the penetration direction from the insertion ends of the mounting portion,
   when passing through the through-hole, the distal parts of the hooks make contact with an inner wall of the through-hole, thereby causing the proximal parts to flex in the flexural direction so as to reduce the distance between the distal parts in the flexural direction,
   after the passing of the distal parts through the through-hole, the proximal parts return to their original shapes, and the distal parts are caught on an inner surface of the casing around the through-hole, the inner surface defining the internal space of the casing, and
   wherein
   each of the hooks of the drain member has a protrusion that protrudes from an outer surface of the proximal part of the hook toward the inner wall of the through-hole to restrict movement of the hook with respect to the through-hole, and
   the through-hole is surrounded by the inner wall formed in the casing.

2. The electric rotating machine as set forth in claim 1, wherein for each of the hooks of the drain member, the distal end of the distal part of the hook is positioned more inside the through-hole of the casing in the flexural direction than the proximal part of the hook is.

3. The electric rotating machine as set forth in claim 1, wherein the hooks of the drain member are arranged so as not to overlap each other in the flexural direction.

4. The electric rotating machine as set forth in claim 1, wherein for each of the hooks of the drain member, the distal part of the hook also has a proximal end which is opposite to the distal end of the distal part in the penetration direction of the through-hole and which is positioned furthest from the proximal part of the hook in the flexural direction,
   the proximal ends of the distal parts of the hooks make up catch ends of the mounting portion which are caught on the inner surface of the casing around the through-hole after the mounting of the mounting portion to the through-hole, and
   the distal parts of the hooks also have flexibility so as to flex in a direction to reduce the distance between the catch ends during the insertion of the hooks into the through-hole.

5. The electric rotating machine as set forth in claim 1, wherein the protrusion is formed apart from the distal part of the hook in the penetration direction of the through-hole.

* * * * *